United States Patent Office 3,372,997
Patented Mar. 12, 1968

3,372,997
TERNARY COPPER, ZINC, CADMIUM AND MANGANESE DICHALCOGENIDES HAVING THE PYRITE-TYPE CRYSTAL STRUCTURE
Tom A. Bither, Jr., Wilmington, Del., assignor to E. I. du Pont de Nemours and Company, Wilmington, Del., a corporation of Delaware
No Drawing. Filed Dec. 22, 1966, Ser. No. 603,759
17 Claims. (Cl. 23—315)

ABSTRACT OF THE DISCLOSURE

Ternary dichalcogenides having the pyrite-type crystal structure of the formula $M_yM'_{1-y}X_z$ wherein M is copper, zinc or cadmium, M' is manganese, zinc or cadmium, X is sulfur, selenium or tellurium, y is a number between 0.20 and 0.96 and z is a number between 1.9 and 2.1 are produced. These compounds are prepared by subjecting mixtures of elements or mixtures of chalcogenides and the chalcogen to pressures between 50–100 kilobars and temperatures between 600–1200° C. The products are useful as components for electrical circuitry.

BACKGROUND OF THE INVENTION

A. Field of the invention

This invention relates to metal chalcogenides and to their preparation.

B. Description of the prior art

The ternary phase $(Cu, Ni)S_2$, having the pyrite-type structure, has been prepared at temperatures up to 500° C., G. H. Moh, Fortschrifte der Mineralogie, 41, 165 (1963). The ternary phase $(Cu, Ni)Se_2$, having the pyrite-type structure (cell constant—$a=5.991$ A.) was synthesized from the elements, in vacuo, at temperatures of 1000–1200° C., J. W. Earley, Amer. Mineral., 35, 338 (1950). The products of this invention, unlike the prior art compounds, cannot be prepared at normal pressures [less than 3 kilobars (kb.)] but require pressures of about 50 kb. or higher.

The compounds of this invention have unexpected advantageous properties. Some of the compounds are ferromagnetic while others are superconducting at low temperatures.

SUMMARY OF THE INVENTION

This invention is directed to isotypic crystalline compositions having the cubic pyrite-type structure of the formula $$M_yM'_{1-y}X_z$$

wherein M is selected from the group consisting of copper, zinc and cadmium, M' is selected from the group consisting of manganese, zinc and cadmium, with the provisos that M and M' are not the same metal and that when either M or M' is zinc, the other M or M' is other than cadmium, y is a number in the range of 0.20 to 0.96, z is a number in the range 1.9 to 2.1 and X is selected from the group consisting of sulfur, selenium and tellurium.

This invention is also directed to a process for preparing the ternary dichalcogenides comprising subjecting (a) a mixture of a chalcogen and elemental zinc and elemental manganese, elemental cadmium and elemental manganese, elemental copper and elemental zinc, elemental copper and elemental cadmium and elemental copper and elemental manganese, or (b) a mixture of metal chalcogenides of the same chalcogen and the chalcogen to a pressure between 50–100 kilobars and a temperature between 600–1200° C.

The products of this invention are useful as electronic components.

DESCRIPTION OF THE PREFERRED EMBODIMENTS

The products of this invention are ternary dichalcogenides of the formulae $$Zn_yMn_{1-y}X_z, Cd_yMn_{1-y}X_z$$
$$Cu_yZn_{1-y}X_z, Cu_yCd_{1-y}X_z$$

and $$Cu_yMn_{1-y}X_z$$

wherein X, y and z are as defined above. These compositions are called ternary dichalcogenides since two different metals and about two atoms of a chalcogen are present.

Nominally, these compositions have the approximate composition of a dichalcogenide having the nominal formulae $Zn_yMn_{1-y}S_2$, $Zn_yMn_{1-y}Se_2$, $Zn_yMn_{1-y}Te_2$, $Cd_yMn_{1-y}S_2$, $Cd_yMn_{1-y}Se_2$, $Cd_yMn_{1-y}Te_2$, $Cu_yZn_{1-y}S_2$, $Cu_yZn_{1-y}Se_2$, $Cu_yZn_{1-y}Te_2$, $Cu_yCd_{1-y}S_2$, $Cu_yCd_{1-y}Se_2$, $Cu_yCd_{1-y}Te_2$, $Cu_yMn_{1-y}S_2$, $Cu_yMn_{1-y}Se_2$ and $$Cu_yMn_{1-y}Te_2$$

The pyrite-type ternary chalcogenides are of approximately corresponding composition to dichalcogenides. However, as is known for other dichalcogenides, deviations from exact stoichiometry sometimes occur. The atomic ratio of chalcogen to total metal in these ternary chalcogenides is in the range of 1.9:1 to 2.1:1. For simplicity, the products are referred to as dichalcogenides in the following. Nonstoichiometric compounds are well recognized, see, e.g., Wadsleys' chapter in Mandelcorn, Non-Stoichiometric Compounds, Academic Press, New York, 1964, pages 98–209.

The ternary dichalcogenides of this invention are of the pyrite-type crystal structure which has the symmetry Pa3 and contains four molecules of $AB_2$ per unit cell (for pyrite, $FeS_2$, the cell edge is about 5.41 A.). The crystal structure is designated as structure type C-2 in the "Strukturbericht" of the Zeitschrift fur Kristallographie.

High pressure is a requisite for the synthesis of these products, and reactions can be carried out at pressures of 50–100 kilobars (kb.) (1 bar=$10^6$ dyne/cm.²). Pressures of 65–89 kb. are preferred. Temperatures in the range 600–1200° C. can be used. Temperatures of 700–1000° C. are a preferred range. Both quenches and slow cools, i.e., 25–200° C. per hour, can be used, with the latter process favoring increased crystallite size in certain cases. Quenching from the final operating temperature to room temperature is extremely rapid and usually occurs within less than one minute of time. Quenching can be accomplished by removal of the electric power supply from heating elements used in the high pressure apparatus. Reaction times of 1–14 hours have been employed prior to the time required for quenching. The reactants can be mixed and pelleted prior to subjecting them to the above reaction conditions.

The reactants used in the process can comprise mixtures of the elements in the desired proportions (powders are preferable in order to achieve good mixing). The appropriate chalcogenides, i.e., ZnS, MnS, CuS, CdS, ZnSe, MnSe, CuSe, CdSe, ZnTe, MnTe, CuTe and CdTe, obtainable at atmospheric pressure plus the necessary amount of chalcogen (i.e., S, Se or Te) can also be used as reactants. Excess chalcogen can be used to shift the equilibrium and favor formation of the desired products. Mixtures of the elements and chalcogenides in the desired proportions can be used as reactants in the process. The metallic chalcogenide reactants are well-known compositions. Other more reactive forms of the metal chalcogenide reactants can also be used.

The products of the invention can be obtained as a single phase or in discrete sections of the reaction mass along with sections comprising unreacted materials and other impurities. The novel dichalcogenides can be separated by hand or mechanical means. Unreacted sulfur can be removed from the product by extraction with carbon disulfide.

The high pressure necessary in these reactions can be obtained using a tetrahedral anvil pressure device as described by E. C. Lloyd, et al., Journal of Res., Nat. Bureau of Standards, 63C, 59 (1959). In this device, the reactants are placed in a boron nitride container which fits in a graphite sleeve that serves as a resistance heater. This assembly is enclosed in a pyrophyllite tetrahedron and placed in the anvil device. Pressures in excess of 65 kb. are possible in a tetrahedral anvil device, which has been demonstrated to levels in excess of 90 kb.

Other devices for developing extreme pressure can also be used, such as a cascade machine providing two stages of pressure, with the lower pressure primary stage serving to support the smaller, higher-pressure vessel. Two stage devices were employed by P. W. Bridgman [Phys. Rev., 57, 342 (1940) and Proc. Am. Acad. Arts Sci., 74, 425 (1942)], and more recently have been described by F. R. Boyd in "Modern Very High Pressure Techniques," Wentorf, Editor, Butterworth and Co., Ltd., London, p. 154 (1962).

In one embodiment of a two-stage device, the pressure in the inner cylindrical vessel is developed by the opposed motion of two carbide pistons. The inner vessel itself is supported radially through a tapered press fit of controlled interference into the cylindrical vessel of the primary stage. Support of both ends of the inner stage is achieved through pressure development in plastic polytetrafluoroethylene employed in the primary stage. Force and motion of the two pistons of the primary stage serve to develop simultaneously the support pressure and the ultimate high pressure in the inner vessel.

The pressure medium of the inner stage is made of the soft plastic mineral pyrophyllite. Centrally located in the pyrophyllite is a cylindrical graphite sleeve which serves as a resistance heater around the boron nitride container. Electrical contacts with the graphite heater are made through the inner pistons which, in turn, are in contact with the pistons of the primary stage vessel. Suitable electrical insulation is provided for one pair of inner and primary pistons.

For a primary stage of fixed diameter, the pressure developed in the polytetrafluoroethylene and the pressure developed in the inner stage are related to the relative lengths and relative compressibilities. As usually controlled, the relative motion of the primary pistons and the force applied to them is correlated with the electrical transitions accompanying recognized phase transitions. In the tetrahedral anvil device, direct correlation of force with electrical transition is possible.

Four of the calibration points used to determine pressure developed in these devices appear in the 1963 edition of the American Institute of Physics Handbook, part 4, page 43, as follows. All values are for ambient temperature.

Bismuth I→II 25.37±0.02 kb.
Bismuth II→III 26.96±0.18 kb.
Thallium II→III 36.69±0.11 kb.
Barium II→III 59.0±1.0 kb.

The additional transformation point of Bi VI→VIII was considered to be 89±3 kb. ("High Pressure Measurement," Giardini-Lloyd, Eds., Butterworth and Co., Ltd., London, page 1 (1963) reporting work by Montgomery, Stromberg, G. H. Jura and G. Jura on calibration studies.)

All compressions in the following examples were made on the cold assembly, and the charges then heated to the desired temperatures. With the anvil device, the appropriate thermocouple was used. No pressure correction for thermocouple behaviour has been introduced, standard E.M.F. tables for 1 atm. being employed. In the cascade device, the temperature obtained was established from a calibration curve of power input vs. temperature determined by observing the melting of nickel and the $\alpha \rightleftharpoons \gamma$ transition in iron in similar assemblies. The melting points of nickel are reported to 60 kb. by Strong "Modern Very High Pressure Techniques," Butterworth and Co., Ltd., London, 1962, p. 115, and were extrapolated to 89 kb. The reference temperatures for the $\alpha \rightleftharpoons \gamma$ transition of iron are reported by Claussen "High Pressure Measurement," Butterworth and Co., Ltd., London, 1963, p. 133. The pressure unit is a bar, equivalent to $10^6$ dynes/cm.$^2$. The larger unit, a kilobar, equal to 1000 bars, is used herein.

The following examples further illustrate the invention. An intensity value of 100 is assigned to the strongest line of the X-ray diffraction patterns of the products.

EXAMPLE 1

*Zinc-manganese disulfide*

($y=0.35$)

A 0.407 g. pellet made from a mixture of 0.150 g. of ZnS, 0.402 g. of MnS, and 0.247 g. of S was heated 1 hour at 1000° C., slow cooled for 5 hours to 875° C., and quenched to room temperature. The pressure throughout the process was 65 kb. Deep red crystals, isolated from the ends of the product, gave an X-ray powder pattern that is listed in Table I below, after deletion of a weak line corresponding to α-MnS. This powder pattern was indexed on the basis of a primitive cubic cell of edge length $a=6.055$ A. The relative intensities of the lines of this pattern approximately match the intensities of the lines of the powder pattern of hauerite, $MnS_2$, which has the $FeS_2$, pyrite-type of structure. This powder pattern also has the proper systematic absences for the pyrite-type space-group Pa3. These data establish that the product has a cubic-pyrite structure.

TABLE I.—DIFFRACTION PATTERN OF A ZINC-MANGANESE DISULFIDE

| Intensity | Spacing, A. | hkl |
|---|---|---|
| 25 | 3.497 | 111 |
| 100 | 3.027 | 200 |
| 50 | 2.707 | 210 |
| 50 | 2.472 | 211 |
| 50 | 2.141 | 220 |
| 5 | 2.018 | 221 |
| 55 | 1.825 | 311 |
| 20 | 1.748 | 222 |
| 20 | 1.679 | 320 |
| 20 | 1.618 | 321 |
| 5 | 1.470 | 410 |
| 5 | 1.427 | 411 |
| 5 | 1.389 | 331 |
| 5 | 1.353 | 420 |
| 5 | 1.321 | 421 |
| 10 | 1.237 | 422 |

Using the cell dimensions of the end members as $ZnS_2$, $a=5.954$ A., and $MnS_2$, $a=6.109$ A., application of Vegard's rule (L. Vegard, Z. Phys. 5, 17 (1921); Z. Krist. 67, 239 (1928)—see also "Concise Chemical and Technical Dictionary," H. Bennett, Chemical Publishing Co., 1962, i.e., "When two similar crystalline materials form a solid solution, the lattice constant of this solution divides the space between their respective lattice constants in ratio to their relative quantities.") showed the product to have the approximate composition $Zn_{0.35}Mn_{0.65}S_2$.

Four probe resistivity measurements on a crystal of this material showed it to be a semiconductor with $\rho_{r.t.}$ of 7.4 ohm cm., $\rho_{172°K}$ of $1.4 \times 10^3$ ohm cm., and an activation energy resistance, $E_a$ 0.14 ev.

EXAMPLE 2

Zinc-manganese disulfide ($y=0.53$)

A 0.390 g. pellet made from a mixture of 0.300 g. of ZnS, 0.268 g. of MnS, and 0.247 g. of S was reacted in the manner of Example 1. Dark red crystals isolated from the ends of the product gave an X-ray powder pattern which was indexed on the basis of a cubic pyrite-type structure with cell dimension $a=6.027$ A. In the manner of Example 1, Vegard's rule showed the product has the approximate composition $Zn_{0.53}Mn_{0.47}S_2$.

Four probe resistivity measurements on a crystal of this material showed it to be a semiconductor with $\rho_{r.t.}$ 1.05 ohm cm., $\rho_{182°K}$ 35 ohm cm., and an activation energy of resistance, $E_a$ 0.14 ev.

EXAMPLE 3

Zinc-manganese disulfide ($y=0.70$)

A 0.251 g. pellet made from a mixture of 0.450 g. of ZnS, 0.134 g. of MnS, and 0.247 g. of S was reacted in the manner of Example 1. Red crystals isolated from the ends of the product gave an X-ray powder pattern that indexed on the basis of a cubic pyrite-type structure with cell dimension $a=6.000$ A. In the manner of Example 1, Vegard's rule showed that the product has the approximate composition $Zn_{0.70}Mn_{0.30}S_2$. Zn/Mn/S ratios based on elemental analyses showed that the product has the composition $Zn_{0.73}Mn_{0.27}S_2$, confirming the $MX_2$ pyrite-type stoichiometry, as well as the validity of Vegard's rule for estimating composition from the cell dimension.

Four probe resistivity measurements on a crystal of this material showed it to be a semiconductor with $\rho_{r.t.}$ 27 ohm cm., $\rho_{107°K}$ $2.7 \times 10^6$ ohm cm., and an activation energy of resistance, $E_a$ 0.17 ev.

EXAMPLE 4

Zinc-manganese diselenide

A 0.677 g. pellet made from a mixture of 0.327 g. of Zn, 0.275 g. of Mn, and 1.737 g. of Se was heated 1 hour at 800° C., slow cooled for 2 hours to 700° C., and quenched to room temperature. The pressure throughout the process was 65 kb. Black crystals isolated from the ends of the product gave an X-ray powder pattern (listed below in Table II), after deletion of weak lines corresponding to ZnSe, MnSe, and Se that was indexed in the manner of Example 1 on the basis of a cubic pyrite-type structure with cell dimension $a=6.360$ A. Using the cell dimensions of the end members as $ZnSe_2$, $a=6.290$ A, and $MnSe_2$, $a=6.430$ A., application of Vegard's rule showed that the product has the composition $$Zn_{0.5}Mn_{0.5}Se_2$$

in agreement with the fusion charge ratio.

TABLE II.—DIFFRACTION PATTERN OF A ZINC-MANGANESE DISELENIDE

| Intensity | Spacing, A. | hkl |
|---|---|---|
| 10 | 3.680 | 111 |
| 100 | 3.183 | 200 |
| 90 | 2.848 | 210 |
| 95 | 2.598 | 211 |
| 65 | 2.249 | 220 |
| 15 | 2.121 | 221 |
| 85 | 1.919 | 311 |
| 15 | 1.836 | 222 |
| 85 | 1.764 | 320 |
| 70 | 1.702 | 321 |
| 25 | 1.591 | 400 |
| 10 | 1.543 | 410 |
| 10 | 1.499 | 411 |
| 25 | 1.388 | 421 |
| 15 | 1.356 | 332 |
| 10 | 1.298 | 422 |
| 5 | 1.247 | 431 |
| 25 | 1.224 | 511 |
| 25 | 1.181 | 520 |
| 15 | 1.161 | 521 |
| 15 | 1.125 | 440 |
| 5 | 1.107 | 522 |
| 5 | 1.061 | 600 |
| 5 | 0.9927 | 621 |
| 5 | 0.9580 | 622 |
| 5 | 0.9477 | 630 |
| 5 | 0.9375 | 631 |
| 5 | 0.9083 | 632 |

Four probe resistivity measurements on a crystal of this material showed it to be a semiconductor with $\rho_{r.t.}$ $9 \times 10^{-3}$ ohm cm., $\rho_{74°K}$ 36 ohm cm., and an activation energy of resistance, $E_a$ 0.07 ev.

EXAMPLE 5

Zinc-manganese ditelluride

A 0.858 g. pellet made from a mixture of 0.114 g. of Zn, 0.096 g. of Mn, and 0.893 g. of Te was heated 2 hours at 800° C., slow cooled for 4 hours to 400° C., and quenched to room temperature. The pressure throughout the process was 65 kb. The product consisted of some red crystals (ZnTe) at the ends followed next by silvery crystals with gray microcrystals in the center (Te). An X-ray powder pattern on the silver-colored crystals (listed below in Table III) was indexed in the manner of Example 1 on the basis of a cubic pyrite-type structure with cell dimension $a=6.874$ A. The cell dimension of $MnTe_2$, $a=6.951$ A., is larger than this value, indicating inclusion of appreciable Zn to give $(Zn, Mn)Te_2$.

TABLE III.—DIFFRACTION PATTERN OF A ZINC-MANGANESE DITELLURIDE

| Intensity | Spacing, A. | hkl |
|---|---|---|
| 40 | 3.980 | 111 |
| 60 | 3.440 | 200 |
| 100 | 3.079 | 210 |
| 100 | 2.810 | 211 |
| 40 | 2.433 | 220 |
| 15 | 2.295 | 221 |
| 90 | 2.074 | 311 |
| 20 | 1.985 | 222 |
| 80 | 1.907 | 320 |
| 92 | 1.838 | 321 |
| 42 | 1.719 | 400 |
| 17 | 1.667 | 410 |
| 10 | 1.623 | 411 |
| 60 | 1.500 | 421 |
| 40 | 1.466 | 332 |
| 10 | 1.404 | 422 |
| 10 | 1.376 | 430 |
| 10 | 1.350 | 431 |
| 10 | 1.321 | 511 |
| 52 | 1.277 | 520 |
| 33 | 1.255 | 521 |
| 40 | 1.215 | 440 |
| 10 | 1.163 | 531 |
| 10 | 1.145 | 600 |
| 10 | 1.131 | 610 |
| 30 | 1.115 | 611 |
| 10 | 1.074 | 621 |
| 10 | 1.048 | 533 |
| 10 | 1.025 | 630 |
| 10 | 1.014 | 631 |
| 10 | 0.992 | 444 |
| 10 | 0.982 | 632 |
| 10 | 0.963 | 711 |

Four probe resistivity measurements on a crystal of this material showed it to be a semiconductor with $\rho_{r.t.}$ $4.6 \times 10^{-3}$ ohm cm., and a low activation energy of resistance, $E_a$ 0.003 ev.

EXAMPLE 6

*Copper-zinc disulfide*

($y=0.95$)

A 0.443 g. pellet made from a mixture of 0.029 g. of ZnS, 0.454 g. of $Cu_2S$, and 0.284 g. of S was reacted in the manner of Example 5. The product consisted of a dense, purple, crystalline cylinder. An X-ray powder pattern on this material (listed below in Table IV) was indexed in the manner of Example 1 on the basis of a cubic pyrite-type structure with cell dimension $a=5.798$ A. Using the cell dimensions of the end members as $CuS_2$, $a=5.790$ A., and $ZnS_2$, $a=5.954$ A., application of Vegard's rule showed that the product has the composition $Cu_{0.95}Zn_{0.05}S_2$, in agreement with the fusion charge.

TABLE IV.—DIFFRACTION PATTERN OF A COPPER-ZINC DISULFIDE

| Intensity | Spacing, A. | hkl |
| --- | --- | --- |
| 70 | 3.340 | 111 |
| 100 | 2.895 | 200 |
| 85 | 2.589 | 210 |
| 90 | 2.366 | 211 |
| 92 | 2.047 | 220 |
| 30 | 1.930 | 221 |
| 83 | 1.741 | 311 |
| 55 | 1.671 | 222 |
| 60 | 1.606 | 320 |
| 63 | 1.548 | 321 |
| 30 | 1.405 | 410 |
| 20 | 1.365 | 411 |
| 48 | 1.328 | 331 |
| 35 | 1.295 | 420 |
| 29 | 1.264 | 421 |
| 20 | 1.234 | 332 |
| 35 | 1.181 | 422 |
| 22 | 1.157 | 430 |
| 22 | 1.136 | 431 |
| 60 | 1.114 | 511 |
| 30 | 1.074 | 520 |
| 22 | 1.057 | 521 |
| 32 | 1.024 | 440 |
| 22 | 0.979 | 433 |
| 29 | 0.965 | 600 |
| 29 | 0.940 | 611 |
| 20 | 0.9166 | 620 |
| 22 | 0.9054 | 621 |
| 27 | 0.8842 | 533 |
| 22 | 0.8740 | 622 |
| 15 | 0.8642 | 630 |
| 15 | 0.8550 | 631 |
| 30 | 0.8282 | 632 |
| 22 | 0.8198 | 543 |
| 28 | 0.8118 | 711 |
| 40 | 0.8040 | 640 |
| 28 | 0.7964 | 720 |
| 28 | 0.7890 | 721 |
| 30 | 0.7748 | 642 |

By application of the Meissner technique (W. Meissner and R. Ochsenfeld, Naturwissensh. 21, 787 [1933]), this material was demonstrated to be a superconductor with a transition in the range 1.9–2.3° K.

EXAMPLE 7

*Copper-zinc disulfide*

($y=0.91$)

A 0.424 g. pellet made from a mixture of 0.117 g. of ZnS, 0.382 g. of $Cu_2S$, and 0.269 g. of S was reacted in the manner of Example 5. The majority of the product consisted of blue-purple crystals. An X-ray powder pattern on these crystals, after deletion of weak lines corresponding to ZnS, was indexed on the basis of a cubic pyrite-type structure with cell dimension $a=5.805$ A. In the manner of Example 6. Vegard's rule showed that the product has the approximate composition $Cu_{0.91}Zn_{0.09}S_2$.

By application of the Meissner technique, this material was demonstrated to be a superconductor with a transition in the range 2.0–2.5° K.

EXAMPLE 8

*Copper-zinc disulfide*

($y=0.8$)

A 0.354 g. pellet made from a mixture of 0.150 g. of ZnS, 0.445 g. of CuS, and 0.247 g. of S was heated 3 hours at 600° C., and quenched to room temperature. The pressure through the process was 65 kb. The product consisted of blue-black microcrystals. An X-ray powder pattern on these crystals was indexed on the basis of a cubic pyrite-type structure with cell dimension $a=5.823$ A. In the manner of Example 6, Vegard's rule showed that the product has the approximate composition $Cu_{0.8}Zn_{0.2}S_2$.

EXAMPLE 9

*Copper-zinc disulfide*

($y=0.2$ AND 0.6)

A 0.087 g. pellet made from a mixture of 0.195 g. of ZnS, 0.191 g. of CuS, and 0.128 g. of S was heated 2 hours at 1000° C., and quenched to room temperature. The pressure throughout the process was 89 kb. The product consisted of small blue-black crystals. An X-ray powder pattern on these crystals was indexed on the basis of two cubic pyrite-type structures with cell dimensions $a_1=5.926$ A. and $a_2=5.851$ A. In the manner of Example 6, Vegard's rule showed the approximate compositions of these two products to be $Cu_{0.2}Zn_{0.8}S_2$ and $Cu_{0.6}Zn_{0.4}S_2$.

The electrical resistance of this material was low, indicating it to be a good conductor.

EXAMPLE 10

*Copper-zinc diselenide*

($y=0.1$ AND 0.62)

A 0.687 g. pellet made from a mixture of 0.654 g. of Zn, 0.635 g. of Cu, and 3.158 g. of Se was heated 4 hours at 800° C., slow cooled for 4 hours to 400° C., and quenched to room temperature. The process was conducted under a pressure of 65 kb. The product was obtained as a cylinder having: (1) a band of black crystals at each end followed by adjacent bands of (2) yellow crystals next (ZnSe), (3) then blue crystals ($CuSe_2$), and (4) a center portion of Se. An X-ray powder pattern on the black crystals was indexed in the manner of Example 1 on the basis of two cubic pyrite-type structures with cell dimensions $a_1=6.274$ A. and $a_2=6.186$ A., after deletion of lines corresponding to some ZnSe. Using the cell dimensions of the end members as $CuSe_2$, $a=6.123$ A., and $ZnSe_2$, $a=6.290$ A., application of Vegard's rule showed that these products have the approximate compositions $Cu_{0.1}Zn_{0.9}Se_2$ and $Cu_{0.62}Zn_{0.38}Se_2$.

EXAMPLE 11

*Copper-zinc ditelluride*

A 0.874 g. pellet made from a mixture of 0.114 g. of Zn, 0.111 g. of Cu, and 0.893 g. of Te was reacted in the manner of Example 5. The product consisted of red crystals (ZnTe) at the ends and a mass of silver-colored crystals in the center containing traces of the red crystals. X-ray powder patterns on two portions of the silver-colored crystals, after deletion of extraneous lines, were indexed on the basis of a cubic pyrite-type structure with cell dimensions in the range $a=6.629-6.634$ A. No $CuTe_2$ ($a=6.600$ A.) was observed in the X-ray patterns of this material. The increase in cell dimension above that of $CuTe_2$ is indicative of inclusion of appreciable Zn to give a (Cu, Zn)$Te_2$ composition.

By application of the Meissner technique, this material was shown to become superconducting at 1.4° K.

EXAMPLE 12

*Copper-manganese disulfide*

($y=0.9$)

A 0.0674 g. pellet made from a mixture of 0.0522 g. of MnS, 0.2295 g. of CuS, and 0.0962 g. of S was heated 6 hours at 800° C. and quenched to room temperature. The pressure throughout the process was 65 kb. The product was a dense, purple, crystalline solid. An X-ray powder pattern on this material (listed below in Table V) was indexed in the manner of Example 1 on the basis of a cubic pyrite-type structure with cell dimension $a=5.823$ A. Using the cell dimensions of the end members as $CuS_2$, $a=5.790$ A., and $MnS_2$, $a=6.109$ A., application of Vegard's rule showed that the product has the approximate composition $Cu_{0.9}Mn_{0.1}S_2$.

TABLE V.—DIFFRACTION PATTERN OF A COPPER-MANGANESE DISULFIDE

| Intensity | Spacing, A. | hkl |
|---|---|---|
| 35 | 3.368 | 111 |
| 100 | 2.916 | 200 |
| 50 | 2.608 | 210 |
| 45 | 2.380 | 211 |
| 50 | 2.061 | 220 |
| 5 | 1.940 | 221 |
| 55 | 1.756 | 311 |
| 20 | 1.681 | 222 |
| 30 | 1.614 | 320 |
| 15 | 1.556 | 321 |
| 5 | 1.413 | 322 |
| 5 | 1.373 | 411 |
| 5 | 1.337 | 331 |
| 5 | 1.303 | 420 |
| 5 | 1.273 | 421 |
| 5 | 1.239 | 332 |
| 10 | 1.188 | 422 |
| 20 | 1.120 | 333 |
| 5 | 1.081 | 520 |
| 5 | 1.062 | 521 |
| 10 | 1.029 | 440 |
| 10 | 0.9688 | 600 |

EXAMPLE 13

*Copper-manganese disulfide*

($y=0.75$ AND $0.92$)

A 0.0676 g. pellet made from a mixture of 0.0783 g. of MnS, 0.2008 g. of CuS, and 0.0962 g. of S was reacted in the manner of Example 12. The resultant product consisted of two phases, one being a black crystalline material and the other a purple crystalline material. X-ray powder patterns on these materials, after deletion of weak lines corresponding to S and MnS, were indexed on the basis of cubic-pyrite type structures with the cell dimension of the black material, $a=5.869$ A., and that of the purple material, $a=5.815$ A. In the manner of Example 12, application of Vegard's law showed that these products have approximate compositions $Cu_{0.75}Mn_{0.25}S_2$ and $Cu_{0.92}Mn_{0.08}S_2$. These materials were magnetic at liquid $N_2$ temperature. Their electrical resistance was low, indicating them to be good conductors.

EXAMPLE 14

*Copper-manganese disulfide*

($y=0.72$)

A 0.375 g. pellet made from a mixture of 0.348 g. of MnS, 0.574 g. of CuS, and 0.321 g. of S was heated 14 hours at 800° C., slow cooled for 8 hours to 200° C., and quenched to room temperature, all at a pressure of 65 kb. A black, crystalline product was obtained. An X-ray diffraction powder pattern obtained thereon, after deletion of weak lines corresponding to MnS, was indexed on the basis of a cubic pyrite-type structure with cell dimension $a=5.880$ A. In the manner of Example 12, application of Vegard's rule showed that the product has the approximate composition $Cu_{0.72}Mn_{0.28}S_2$.

Four probe resistivity measurements on a crystal of this material indicated it to have metallic-type conduction with $\rho_{35° K.}$ $3.7 \times 10^{-4}$ and $\rho_{r.t.}$ $6.0 \times 10^{-4}$ ohm cm. This material is ferromagnetic with a saturation magnetization value of 26 e.m.u./g. (0° K.) and a Curie temperature of 106° K.

EXAMPLE 15

*Copper-manganese disulfide*

($y=0.54$)

A 0.0607 g. pellet made from a mixture of 0.1740 g. of MnS, 0.1912 g. of CuS, and 0.1283 g. of S was reacted in the manner of Example 12. A black, crystalline product was formed. An X-ray diffraction powder pattern obtained on this material, after deletion of weak lines corresponding to MnS, was indexed on the basis of a cubic pyrite-type structure with cell dimension $a=5.936$ A. In the manner of Example 12, application of Vegard's rule showed that the product has the approximate composition $Cu_{0.54}Mn_{0.46}S_2$.

EXAMPLE 16

*Copper-manganese disulfide*

($y=0.3$)

A 0.417 g. pellet made from a mixture of 0.274 g. of MnS, 0.129 g. of CuS, and 0.144 g. of S was heated 8 hours at 800° C., slow cooled for 4 hours to 400° C., and quenched to room temperature. The pressure throughout the process was 65 kb. A black, microcrystalline solid was formed. An X-ray diffraction powder pattern obtained on this material was indexed on the basis of a cubic pyrite-type structure. Broadness of lines in the powder pattern suggested a range of homogeneity in this sample, with an average cell dimension around $a=6.00$ A. In the manner of Example 12, application of Vegard's rule indicated the product has the approximate composition $Cu_{0.3}Mn_{0.7}S_2$.

Magnetic measurements indicated this material to be ferromagnetic with a saturation magnetization value of 16 e.m.u./g. (0° K.) and a Curie temperature of 108° K.

EXAMPLE 17

*Copper-manganese diselenide*

($y=0.45$)

A 0.646 g. pellet made from a mixture of 0.275 g. of Mn, 0.318 g. of Cu, and 1.737 g. of Se was reacted in the manner of Example 4. A black, crystalline product was formed. An X-ray diffraction pattern on a portion of this material near the end of the sample was indexed in the manner of Example 1 on the basis of a cubic pyrite-type structure with cell dimension $a=6.293$ A. Using the cell dimensions of the end members as $MnSe_2$, $a=6.430$ A., and $CuSe_2$, $a=6.123$ A., application of Vegard's rule showed that the product has the approximate composition $Cu_{0.45}Mn_{0.55}Se_2$, in close agreement with the fusion charge ratio.

Four probe resistivity measurements on a crystal of this material indicated it to have metallic-type conduction with $\rho_{4° K.}$ $5.5 \times 10^{-4}$ and $\rho_{r.t.}$ $8 \times 10^{-4}$ ohm cm. Magnetic measurements indicated that this material was ferromagnetic with a saturation magnetization value of 13 e.m.u./g. (0° K.) and a Curie temperature of 89° K.

EXAMPLE 18

*Copper-manganese ditelluride*

($y=0.3$)

A 0.859 g. pellet made from a mixture of 0.111 g. of Cu, 0.096 g. of Mn, and 0.893 g. of Te was reacted in the manner of Example 5. The product consisted of bright slivery crystals at the ends. An X-ray diffraction powder pattern obtained on these crystals was indexed on the basis of a cubic pyrite-type structure. Broadness of lines in the powder pattern suggested a range of homogeneity in the sample with cell dimensions from $a=6.84$ to 6.85 A. Using the cell dimensions of the end members as $MnTe_2$, $a=6.951$ A., and $CuTe_2$, $a=6.600$ A., application of Vegard's rule showed that the product has the approximate average composition $Cu_{0.3}Mn_{0.7}Te_2$.

The room temperature resistivity of this material was $1\times10^{-3}$ ohm cm. and it was weakly magnetic with a Curie temperature of 60° K.

EXAMPLE 19

*Cadmium-manganese disulfide*

$$(y=0.6)$$

The aqueous reaction of $CdSO_4/Na_2S_2O_3 \cdot 5H_2O$ (1/2 mole ratio), carried out according to the method of E. Grillot (Bull. Soc. Chim. France [1951], 39), gave an essentially amorphous, reactive cadmium sulfide. The X-ray diffraction pattern of this product showed it to be the wurtzite form of CdS having extremely poor crystallinity plus some free sulfur. A 0.460 g. pellet made from a mixture of 0.883 g. of the amorphous reactive CdS, 0.435 g. of MnS, and 0.241 g. of S was heated 2 hours at 700° C., slow cooled cooled for 6 hours to 400° C., and quenched to room temperature. The pressure throughout the process was 65 kb. The resultant product, after extraction with $CS_2$ to remove unreacted sulfur, consisted of a red-orange powder interspersed with tiny black crystallites ($\alpha$-MnS). An X-ray diffraction powder pattern on the above, after deletion of extraneous weak lines, was indexed on the basis of a cubic pyrite-type structure with cell dimension $a=6.228$ A. Using the cell dimensions of the end members as $CdS_2$, $a=6.309$ A., and MnS, $a=6.109$ A., application of Vegard's rule showed that the product has the approximate composition $Cd_{0.6}Mn_{0.4}S_2$.

EXAMPLE 20

*Cadmium-manganese diselenide*

$$(y=0.44)$$

A 0.727 g. pellet made from a mixture of 0.191 g. of Cd, 0.094 g. of Mn, and 0.866 g. of Se was heated 2 hours at 1000° C., slow cooled for 6 hours to 400° C., and quenched to room temperature. The pressure throughout the process was 65 kb. The resultant product consisted of red-brown crystals at the ends followed by bands of black crystals with the center portion being dominantly Se. An X-ray diffraction powder pattern on the black crystals (listed below in Table VI) indicated a single phase material having a cubic pyrite-type structure with cell dimension $a=6.511$ A. Using the cell dimensions of the end members as $CdSe_2$, $a=6.615$ A., and $MnSe_2$, $a=6.430$ A., application of Vegard's rule showed that the product has the approximate composition $$Cd_{0.44}Mn_{0.56}Se_2$$

The measured density of this material was 5.789 g./cm.³ and the density calculated for four molecules of

$Cd_{0.44}Mn_{0.56}Se_2$ per unit cell $a=6.511$ A., was 5.730 g./cm.³. The similarity of the observed and calculated density of the product confirms the validity of Vegards' rule for estimating composition from the cell dimension.

TABLE VI.—DIFFRACTION PATTERN OF A CADMIUM-MANGANESE DISELENIDE

| Intensity | Spacing, A. | hkl |
|---|---|---|
| 100 | 3.256 | 200 |
| 100 | 2.913 | 210 |
| 100 | 2.658 | 211 |
| 70 | 2.302 | 220 |
| 15 | 2.170 | 221 |
| 95 | 1.963 | 311 |
| 25 | 1.880 | 222 |
| 70 | 1.806 | 320 |
| 80 | 1.740 | 321 |
| 5 | 1.628 | 400 |
| 15 | 1.579 | 410 |
| 20 | 1.494 | 331 |
| 10 | 1.456 | 420 |
| 25 | 1.421 | 421 |
| 15 | 1.388 | 332 |
| 10 | 1.329 | 422 |
| 10 | 1.277 | 431 |
| 55 | 1.253 | 511 |
| 20 | 1.209 | 520 |
| 15 | 1.189 | 521 |
| 25 | 1.151 | 440 |
| 15 | 1.085 | 600 |
| 20 | 1.056 | 611 |
| 10 | 1.017 | 621 |
| 5 | 1.005 | 541 |
| 10 | 0.993 | 533 |
| 10 | 0.912 | 711 |
| 15 | 0.903 | 640 |
| 10 | 0.894 | 720 |
| 10 | 0.886 | 721 |
| 15 | 0.848 | 731 |

Four probe resistivity measurements on a crystal of this cadmium manganese diselenide showed it to be a semiconductor with a room temperature resistivity of 1.0 ohm cm. and an activation energy of resistance, $E_a$ 0.1 ev.

EXAMPLE 21

*Copper-cadmium disulfide*

$$(y=0.96)$$

A 0.430 g. pellet made from a mixture of 0.430 g. of CuS, 0.088 g. of essentially amorphous cadmium sulfide (Example 19), and 0.160 g. of S was reacted in the manner of Example 19. A fine grained, purple, crystalline product was formed. The product was extracted with $CS_2$ to remove unreacted sulfur. An X-ray diffraction powder pattern on this material (listed below in Table VII) was indexed on the basis of a cubic pyrite-type structure with cell dimension $a=5.809$ A. Using the cell dimensions of the end members as $CuS_2$, $a=5.790$ A., and $CdS_2$, $a=6.309$ A., application of Vegard's rule showed the product has the approximate composition $$Cu_{0.96}Cd_{0.04}S_2$$

TABLE VII.—DIFFRACTION PATTERN OF A COPPER-CADMIUM DISULFIDE

| Intensity | Spacing, A. | hkl |
|---|---|---|
| 60 | 3.354 | 111 |
| 100 | 2.904 | 200 |
| 75 | 2.597 | 210 |
| 70 | 2.371 | 211 |
| 90 | 2.053 | 220 |
| 10 | 1.936 | 221 |
| 95 | 1.751 | 311 |
| 45 | 1.677 | 222 |
| 45 | 1.611 | 320 |
| 50 | 1.552 | 321 |
| 10 | 1.408 | 410 |
| 40 | 1.333 | 331 |
| 25 | 1.299 | 420 |
| 15 | 1.268 | 421 |
| 20 | 1.186 | 422 |
| 10 | 1.162 | 430 |
| 15 | 1.139 | 431 |
| 50 | 1.118 | 511 |
| 15 | 1.078 | 520 |
| 10 | 1.061 | 521 |
| 20 | 1.027 | 440 |
| 15 | 0.982 | 531 |
| 15 | 0.968 | 600 |
| 10 | 0.942 | 611 |
| 5 | 0.907 | 621 |
| 10 | 0.886 | 533 |
| 20 | 0.806 | 640 |

By application of the Meissner technique, a second sample of copper-cadmium disulfide having the same cell dimension, $a=5.809$ A., was demonstrated to be a superconductor with a transition in the range starting below 1.3° K. and terminating at 2.0° K.

EXAMPLE 22

*Copper-cadmium diselenide*

($y=0.95$)

A 0.748 g. pellet made from a mixture of 0.354 g. of Cd, 0.200 g. of Cu, and 0.995 g. of Se was reacted in the manner of Example 20. A polyphase cylinder of product resulted that comprised (1) a band of black crystals (CdSe) at each end followed by (2) a band of blue crystals, and (3) a center portion predominantly of Se. An X-ray diffraction powder pattern on the blue crystals (listed below in Table VIII), after deletion of weak lines of cadmium selenide, was indexed on the basis of a cubic pyrite-type structure with cell dimension $a=6.146$ A. Using the cell dimensions of the end members as $CuSe_2$, $a=6.123$ A., and $CdSe_2$, $a=6.615$ A., application of Vegard's rule showed that the product has the approximate composition $Cu_{0.95}Cd_{0.05}Se_2$.

TABLE VIII.—DIFFRACTION PATTERN OF A COPPER CADMIUM DISELENIDE

| Intensity | Spacing, A. | hkl |
|---|---|---|
| 100 | 3.078 | 200 |
| 100 | 2.753 | 210 |
| 100 | 2.513 | 211 |
| 75 | 2.175 | 220 |
| 15 | 2.051 | 221 |
| 100 | 1.855 | 311 |
| 30 | 1.775 | 222 |
| 95 | 1.706 | 320 |
| 100 | 1.644 | 321 |
| 20 | 1.537 | 400 |
| 15 | 1.491 | 410 |
| 15 | 1.450 | 411 |
| 10 | 1.410 | 331 |
| 10 | 1.376 | 420 |
| 40 | 1.342 | 421 |
| 30 | 1.311 | 332 |
| 15 | 1.255 | 422 |
| 10 | 1.230 | 430 |
| 10 | 1.205 | 431 |
| 40 | 1.183 | 511 |
| 35 | 1.142 | 520 |
| 25 | 1.123 | 521 |
| 30 | 1.087 | 440 |
| 10 | 1.070 | 522 |
| 10 | 1.025 | 600 |
| 25 | 0.998 | 611 |
| 10 | 0.960 | 621 |
| 15 | 0.938 | 533 |
| 10 | 0.927 | 622 |
| 10 | 0.861 | 711 |
| 15 | 0.852 | 640 |
| 15 | 0.844 | 720 |
| 20 | 0.837 | 721 |
| 15 | 0.800 | 731 |

By application of the Meissner technique, this material was demonstrated to be a superconductor with a transition in the range 1.3–2.0° K.

EXAMPLE 23

*Copper-cadmium ditelluride*

A 0.934 g. pellet made from a mixture of 0.191 g. of Cd, 0.108 g. of Cu, and 0.868 g. of Te was reacted in the manner of Example 20. The product consisted of steel blue crystals (CdTe) at the ends and silvery crystals in the center. An X-ray diffraction powder pattern on the silvery material, after deletion of extraneous lines, was indexed on the basis of a cubic pyrite-type structure with cell dimension $a=6.610$ A. The increase in cell dimension above that of $CuTe_2$ ($a=6.600$ A.) is indicative that a (Cu, Cd)$Te_2$ composition was formed.

The compounds of this invention are useful as components of electronic devices. For example, the ternary dichalcogenides $Zn_yMn_{1-y}X_2$ and $Cd_yMn_{1-y}X_2$ are semiconductors which can be used as components of rectifiers, modulators, detectors, and thermistors in electrical circuits. They show large Seebeck coefficients and are useful in thermo-electric heating and cooling devices.

$Cu_yMn_{1-y}X_2$ ternaries are magnetic and exhibit metallic electrical conductivity. They can be used as electrical conductors and as low-temperature thermomagnetic switching elements. Both $Cu_yZn_{1-y}X_2$ and $Cu_yCd_{1-y}X_2$ ternaries exhibit metallic conductivity and are useful as electrical conductors. Those $Cu_yZn_{1-y}X_2$ and $Cu_yCd_{1-y}X_2$ ternaries containing up to about 10 atom percent (based on total metals) zinc or cadmium (i.e., $1-y$ equal to or less than 0.1) are superconductors at low temperatures. As compared with the corresponding copper disulfides, the presence of a small amount of zinc or cadmium increases the temperature range over which superconductivity is exhibited. For example, $Cu_{0.96}Cd_{0.04}S_2$ is superconducting below 2.0° K., whereas $CuS_2$ is superconducting below 1.5° K. Similarly, $Cu_{0.95}Zn_{0.05}S_2$ and $Cu_{0.91}Zn_{0.09}S_2$ are superconducting below 2.3° K. and 2.5° K., respectively. This enhancement of superconductivity is unexpected since the $ZnS_2$ binary is not superconducting.

The following examples further illustrate the utility of the products of this invention.

Example A $Cu_{0.9}Mn_{0.1}S_2$ (Example 12) is magnetic at liquid $N_2$ temperature and its electrical resistance is low (room temperature), indicating it to be a good conductor. A portion of this material was connected in series with a 3-volt battery and a 3-volt lightbulb. When the circuit was closed, the lightbulb shone brightly, indicating the utility of this product as an electrical conductor.

Example B $Cu_{0.54}Mn_{0.46}S_2$ (Example 15) is magnetic and has a low electrical resistance. It was incorporated in a thermomagnetic switching device so as to utilize these properties. The sample was mounted in a circuit under spring tension, sufficient to hold it firmly against an electrical contact forming one side of a switch. The sulfide itself served as the other switch contact. The remainder of the circuit consisted of a 3-volt battery and an ohmmeter connected in series with the switch. A permanent magnet was mounted so that the sulfide was in the magnetic field. At room temperature, the switch was closed and current flowed through the circuit as indicated by the ohmmeter reading. When the sulfide was cooled below its Curie point, the switch opened and current in the circuit was interrupted. On rewarming, magnetization of the sulfide decreased and the switch again closed.

The foregoing detailed description has been given for clarity of understanding only and no unnecessary limitations are to be understood therefrom. The invention is not limited to the exact details shown and described, for obvious modifications will be apparent to those skilled in the art.

The embodiments of the invention in which an exclusive property or privilege is claimed are defined as follows:

1. Ternary dichalogenides having a pyrite-type crystal structure of the formula $M_yM'_{1-y}X_z$ wherein:
    (a) M is selected from the group consisting of copper, zinc and cadmium;
    (b) M' is selected from the group consisting of manganese, zinc and cadmium, with the provisos that M and M' are not the same metal and when either M or M' is zinc, the other M or M' is other than cadmium;
    (c) X is selected from the group consisting of sulfur, selenium and tellurium; and
    (d) $y$ is a number in the range 0.20 to 0.96, and $z$ is a number in the range 1.9 to 2.1.

2. The compound of claim 1 of the formula $Zn_yMn_{1-y}X_z$ wherein X, y and z have the meaning defined in claim 1.

3. The compound of claim 1 of the formula $$Cd_yMn_{1-y}X_z$$

wherein X, y and z have the meaning defined in claim 1.

4. The compound of claim 1 of the formula $$Cu_yZn_{1-y}X_z$$

wherein X, y and z have the meaning defined in claim 1.

5. The compound of claim 1 of the formula $$Cu_yCd_{1-y}X_z$$

wherein X, y and z have the meaning defined in claim 1.

6. The compound of claim 1 of the formula $$Cu_yMn_{1-y}X_z$$

wherein X, y and z have the meaning defined in claim 1.

7. The compound of claim 2 of the formula $$Zn_{0.35}Mn_{0.65}S_2$$

8. The compound of claim 2 of the formula $$Zn_{0.5}Mn_{0.5}Se_2$$

9. The compound of claim 3 of the formula $$Cd_{0.6}Mn_{0.4}S_2$$

10. The compound of claim 3 of the formula $$Cd_{0.44}Mn_{0.56}Se_2$$

11. The compound of claim 4 of the formula $$Cu_{0.91}Zn_{0.09}S_2$$

12. The compound of claim 5 of the formula $$Cu_{0.96}Cd_{0.04}S_2$$

13. The compound of claim 5 of the formula $$Cu_{0.95}Cd_{0.05}Se_2$$

14. The compound of claim 6 of the formula $$Cu_{0.72}Mn_{0.28}S_2$$

15. The compound of claim 6 of the formula $$Cu_{0.45}Mn_{0.55}Se_2$$

16. The compound of claim 6 of the formula $$Cu_{0.3}Mn_{0.7}Te_2$$

17. A process for preparing a ternary dichalcogenide of claim 1 comprising subjecting (a) a mixture of chalcogen and elemental zinc and elemental manganese, elemental cadmium and elemental manganese, elemental copper and elemental zinc, elemental copper and elemental cadmium and elemental copper and elemental manganese, or (b) a mixture of metal chalcogenides of the same chalcogen and the chalcogen, to a pressure between 50–100 kilobars and a temperature between 600–1200° C.

References Cited

UNITED STATES PATENTS

| | | | |
|---|---|---|---|
| 3,008,797 | 11/1961 | Bither | 23—315 |
| 3,298,777 | 11/1967 | Brixner | 23—315 |

OTHER REFERENCES

Zhuze et al.: Semiconducting Compound With the General Formula $ABX_2$, "Soviet Physics," vol. 3, number 10, October 1958, pp. 1925–1938.

OSCAR R. VERTIZ, *Primary Examiner.*

H. S. MILLER, *Assistant Examiner.*